(12) United States Patent
Homonoff et al.

(10) Patent No.: US 6,695,148 B2
(45) Date of Patent: Feb. 24, 2004

(54) TRANSMISSION FILTER FELT

(76) Inventors: Edward C. Homonoff, 66 Bush Hill Rd., Brooklyn, CT (US) 06234; John A. Davis, RT 3 River Rd., Camden, NY (US) 13316; Stephen D. Copperwheat, 7716 Kilbourne Rd., Rome, NY (US) 13440; Richard W. Mayo, 302 Fuller Rd., Central Square, NY (US) 13036; Franklin D. Cean, 10440 NYS RT 3, Adams, NY (US) 13605

( * ) Notice: Subject to any disclaimer, the term of this patent is extended or adjusted under 35 U.S.C. 154(b) by 0 days.

(21) Appl. No.: 10/224,264

(22) Filed: Aug. 20, 2002

(65) Prior Publication Data

US 2003/0010710 A1 Jan. 16, 2003

Related U.S. Application Data

(63) Continuation-in-part of application No. 09/998,739, filed on Nov. 30, 2001, now abandoned, which is a continuation of application No. 09/320,800, filed on May 27, 1999, now abandoned.

(51) Int. Cl.[7] .............................................. B01D 39/16
(52) U.S. Cl. ...................... 210/491; 210/496; 210/492; 210/505; 210/508; 210/510.1
(58) Field of Search ................................ 210/491, 496, 210/492, 505, 508, 510.1; 264/DIG. 48

(56) References Cited

U.S. PATENT DOCUMENTS

| | | | |
|---|---|---|---|
| 3,347,391 A | * | 10/1967 | Steensen ..................... 210/491 |
| 3,552,553 A | | 1/1971 | Reading |
| 3,784,011 A | | 1/1974 | Ward |
| 4,093,437 A | | 6/1978 | Ichihara et al. |
| 4,211,661 A | | 7/1980 | Perry |
| 4,250,039 A | | 2/1981 | Cozzi et al. |
| 4,324,574 A | | 4/1982 | Fagan |
| 4,402,827 A | | 9/1983 | Joseph |
| 4,450,081 A | | 5/1984 | Anderson et al. |
| 4,604,200 A | | 8/1986 | Machart, Jr. |
| 4,701,197 A | | 10/1987 | Thornton et al. |
| 4,732,675 A | | 3/1988 | Badalato et al. |
| 4,793,923 A | | 12/1988 | Kadoya et al. |
| 4,948,515 A | | 8/1990 | Okumura et al. |
| 4,976,858 A | | 12/1990 | Kadoya |
| 4,983,434 A | | 1/1991 | Sassa |
| 5,130,134 A | | 7/1992 | Noddin et al. |
| 5,288,402 A | | 2/1994 | Yoshida |
| 5,308,508 A | | 5/1994 | Womack |
| 5,414,915 A | | 5/1995 | Pryne |
| 5,672,188 A | | 9/1997 | Choi |
| 5,714,067 A | | 2/1998 | Sorrick |
| 5,728,298 A | | 3/1998 | Hamlin |
| 5,766,288 A | | 6/1998 | Thiele et al. |

OTHER PUBLICATIONS

Publication entitled "Induction Air Filters for Automotive Applications" by Clarke A. Rodman, date N/A.

Publication entitled "Fibers for Nonwovens with Emphasis on Filtration Theory and Applications" by Clarke A. Rodman, Albany International Research Co., Mansfield, MA, date N/A.

Publication from The Second World Filtration Congress 1979 entitled "Filte Media Performance and Fibre Morphology" by C.A. Rodman, Fram Corporation, Providence, U.S.A.

* cited by examiner

Primary Examiner—Terry K. Cecil
(74) Attorney, Agent, or Firm—Wall Marjama & Bilinski LLP

(57) ABSTRACT

A transmission fluid filter material and transmission filter produced therefrom comprising a gradient density composite felt which exhibits high particle removal efficiency at 40 micron diameter particle size and larger with exceptionally high dirt holding capacity and no significant increase in clean pressure drop. The upstream portion of the composite felt contains fine fibers that selectively remove first the fine particles while the downstream portion acts to sieve coarse particles and build a porous filter cake, thereby extending the useful life of the filter.

17 Claims, 2 Drawing Sheets

TRANSMISSION FILTER FELT

CROSS REFERENCE TO RELATED APPLICATION

This is a continuation in part application of U.S. Ser. No. 09/998,739 filed Nov. 30, 2001, now abandoned, which is a continuation of U.S. Ser. No. 09/320,800, filed May 27, 1999, now abandoned.

FIELD OF THE INVENTION

This invention relates generally to a filter media, and more specifically to a high efficiency, high dirt holding capacity filter for automatic transmissions for automobiles.

BACKGROUND OF THE INVENTION

Automatic transmissions in automobiles have filters that remove contaminant that is generated by or becomes entrained in the transmission system. These filters use a 100% polyester needle punch felt that is saturated with phenolic resin. The "Big 3" OEM's (GM, Ford, and Chrysler) specify for original equipment applications a material that must be 90% efficient at removing 60 micron diameter particles or larger with a low clean pressure drop. ISO 4572 (Multi-pass Filtration Performance Test—Beta) is used as the hydraulic evaluation method to determine filter performance. A flat-sheet version of this test is used in evaluating filter media.

Recently designed transmissions have smaller clearances and are susceptible to smaller contaminant particles in the oil. Specifically, 40 micron diameter particles in the transmission fluid have been found to foul the electronic valves in the transmission. The OEM's want to change their specifications to make the transmission filter more efficient at removing these particles without any loss in filter life or increase in clean pressure drop across the filter, corresponding to a loss in gas mileage due to increased power consumption. Current filters are between 40–75% efficient for removing 40 micron diameter particles or larger. The OEM's have asked for at least 80% efficiency at 40 microns diameter or larger and desire 90% efficiency at 40 microns diameter or larger and 99% efficiency at 60 microns diameter or larger with no loss in dirt holding capacity or increase in clean pressure drop.

A number of companies have attempted to achieve these performance levels but have been unsuccessful. Single-layered felts have been "tightened" by increasing their density and decreasing their permeability to achieve close to the level of efficiency required. This has resulted in unacceptable increases in clean pressure drop, and losses in dirt holding capacity in the filter element. Saturated felts with precision woven 70–75 micron diameter hole polyester screens laminated to them have been developed that are 70–75% efficient at 40 microns diameter or larger, with no appreciable increase in pressure drop but with dirt holding capacities equivalent to the single layered felt filter media. U.S. Pat. No. 3,784,011 teaches the addition of a second layer of felt to the filter to reduce the clean pressure drop by presenting a low resistance to fluid flow. The filter materials work in parallel as the flow of transmission fluid passes through either one or the other felt layers, but does not pass through both. The low resistance to flow is due to the additional filter media area in the filter. U.S. Pat. No. 4,093,437 describes a multilayered air filter material which is improved in dust holding capacity and in air filter efficiency. This patent teaches that the third layer of the construction is produced in such a manner as to "catch fine particles passed through the upper layer and the intermediate layer". This tight bottom layer gives the filter material a high clean pressure drop and high starting resistance to flow before it starts to load with dust as compared to the other filter materials disclosed in the patent. U.S. Pat. No. 4,701,197 describes a molded air panel filter of two different members. One of the members is molded into a convoluted design of substantially parallel pleats with the other filter member being an open, "batt-like" material especially adapted to capturing fine particles, both members requiring thermoplastic fibers to be moldable into the filter article. This filter is not suitable for a transmission filter as this media construction would not withstand the operating temperature of the transmission environment.

U.S. Pat. No. 5,728,298 teaches a molded gradient density filter element with an inner shell of a first large pore size porous media adjacent the hollow core (downstream to fluid flow) and forming a majority of the filter structure, and an outer shell of a second small pore size porous media (upstream to fluid flow), finer than the first porous media and adjacent to the inner shell. The first and second porous media are resin impregnated and bonded together. The filter is described as having finer efficiency than if the finer porous media were on the downstream side adjacent the hollow inner tube. The filtering technique that is employed by this filter design (a molded filter cylinder) is surface filtration. Therefore, the area of fine pore surface available for filtering is key to how the filter performs. A surface filter of this type will have less available area on the inside diameter of the hollow core than on the outside of the filter. If the fluid volumetric flow is constant through the filter, then the filter will have a much lower face velocity (defined as the volume of fluid divided by the available fine pore size filter surface area) when the fine pore size surface is on the outside of the filter then if the fine pore size surface is the same as the hollow core inside diameter of the filter. It is well known in the art of filtration that a significant increase in efficiency is to be expected when the face velocity of the fluid flow across the filtering surface is reduced significantly, as is with the filter of the '298 patent. It is also well known in the art of filtration that, when surface filtration is the predominant filtering technique employed in the filter, the dirt holding capacity of the filter (or amount of time it will take for the surface of the filter to plug) is reduced when the fine surface of the filter medium is the first to see fluid flow. In this case, the filter efficiency was increased by increasing the area of the fine pore surface media at the expense of the dirt holding capacity of the filter.

U.S. Pat. No. 5,288,402 is directed to a liquid filter medium including a fibrillated filtering layer and an organic fiber support. The patent teaches the use of fine fibers (blends of 1 micron and below, 1–5 microns, and greater than 5 microns) in a two layer filter medium. It also uses a binder fiber as a part of the mix which cannot be used in a transmission filter. The '402 patent does not describe the thickness of the filter material and does not appear concerned with void volume.

SUMMARY OF THE INVENTION

It is, therefore, an object of the present invention to provide a filter medium which overcomes the problems of prior art described above.

It is a further object of the present invention to provide a transmission filter medium with a dirt removal efficiency of at least 99% for particles 60 microns diameter and larger.

It is another object of the present invention to provide a transmission filter medium with a dirt removal efficiency of at least 80% for particles of 40 microns diameter and larger.

It is yet another object of the present invention to provide a highly efficient filter medium which exhibits superior dirt holding capacity.

It is yet a further object of the present invention to provide a highly efficient filter medium which exhibits no significant increase in clean pressure drop.

It is yet another object of the present invention to provide a transmission filter that is highly efficient, exhibits high dirt holding capacity, and exhibits a low clean pressure drop.

These and other objects are achieved, as described herein, by forming individual batts of fibers from selected fiber types and fiber fineness, which are blended in selected ratios to achieve a desired length averaged fiber diameter for the desired gradient density final composite felt material. This is followed by consolidating the fiber batts through needling into individual felt components and assembling at least two single fiber felt components into a composite felt material, combining the individual felts together in series into a single gradient density felt that has been needled together into a composite felt material having a more open, fine particle removing fiber component upstream and a coarse particle removing fiber component downstream. The composite felt is constructed to achieve the desired final length averaged fiber diameter. The composite felt is then singed to remove loose fibers, and then is saturated with a specified amount of a resin to form the final filter material.

As described in a paper presented at the Second World Filtration Congress 1979 entitled "Filter Media Performance and Fibre Morphology" by C. A. Rodman, which is incorporated herein by reference, the present invention works by using the impaction mechanism of filtration to selectively remove the smaller, plugging particles from the fluid stream before a filter cake can build and be plugged by them. The openness of the pore structure of the top portion of the layer of the gradient density material allows the larger particles to move by inertia through this portion of the felt, and become mechanically entrapped by the tighter downstream portion of the felt. The removal of the fine particles first and the coarser particles second means that the gradient density structure acts as a particle classifier, selectively removing particles of small size upstream so that the larger particles can be sieved downstream. This allows the filter cake to build longer with large particles without significant increases in pressure drop, and create a more porous filter cake and longer useful life.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

A gradient density, filter felt has been developed that is at least 80% efficient for 40 micron diameter particles and larger, and at least 99% efficient for 60 micron diameter particles and larger, with no appreciable increase in clean pressure drop and with significant increases in dirt holding capacity over standard transmission filter felts used today. This material is produced from individual batts of fiber blends selected for their fiber fineness and fiber type which are combined together into a single composite felt to achieve a desired length averaged fiber diameter and density. The individual batt of fiber are produced by opening and blending fibers together in selected weight ratios on standard textile fiber opening equipment, further opening and blending the fibers on textile cards, cross lapping the carded webs to form individual batts of blended fibers, and needling the batts together to produce individual felt components for later combination. The individual felt components are then combined in series and needled together to produce a single composite felt material that is then collected into a roll. The composite felt is then singed to remove loose surface fibers and saturated with resin to stiffen the resultant filter media.

Figure 1:
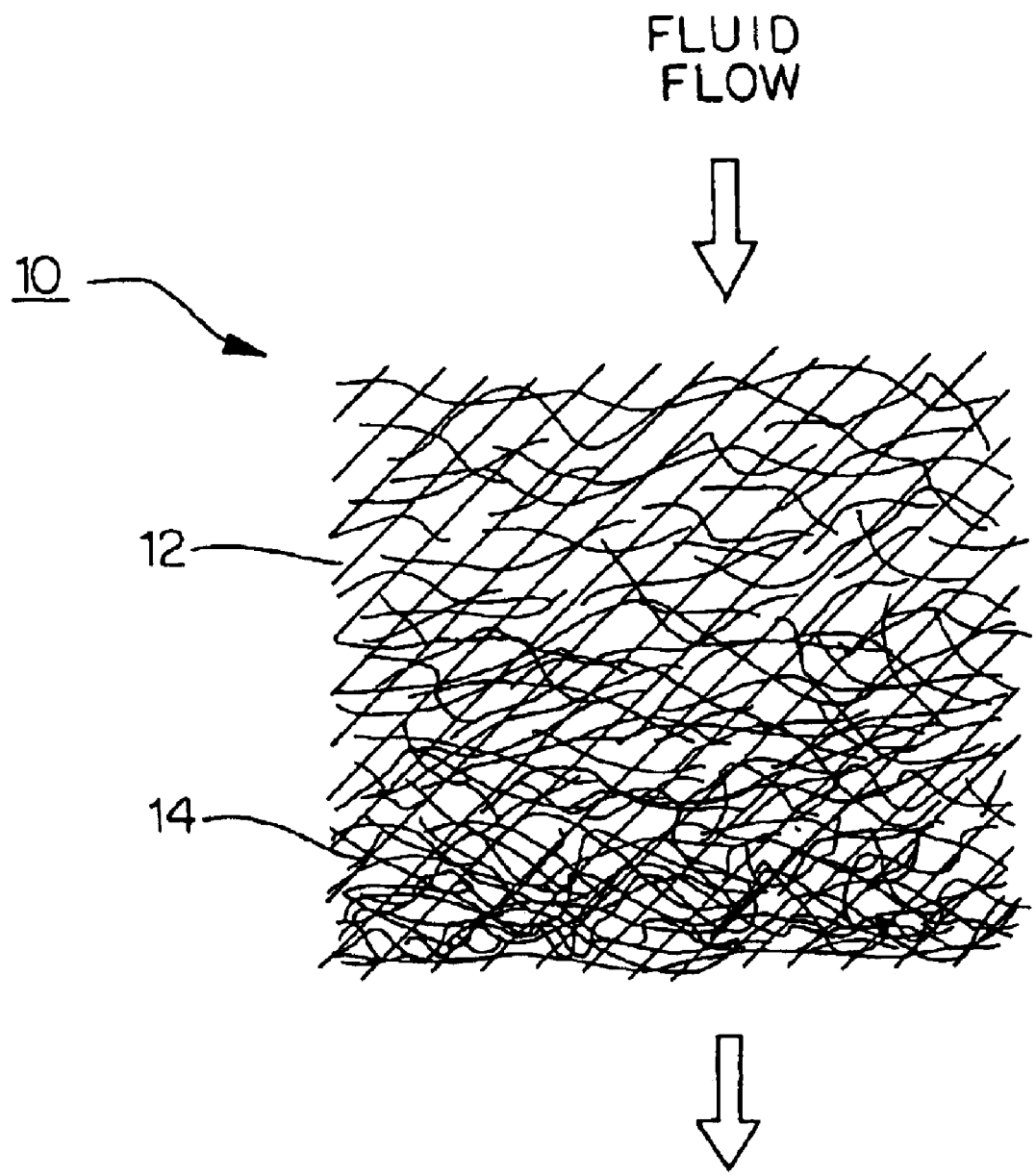
FIG. 1 is cross-sectional schematic view of the filter medium of the present invention.

The gradient density felt is produced in such a manner that the two single batt components, when combined into a single composite felt of the invention, have different densities with the more open, fine particle removing portion of the composite felt being upstream and the coarse particle removing portion of the composite felt being downstream with said two portions combined together to achieve the desired final composite length averaged fiber diameter. This filter structure is illustrated more clearly in FIG. 1 of the drawings in which filter material 10 consists of an open upstream portion 12 of a blend of fine and coarse diameter fibers suitable for the removal of fine particles and a downstream portion 14 of relatively coarser diameter fibers suitable for mechanical entrapment of coarse diameter particles. The individual felt components are then needlepunched together to form a gradient density composite felt.

It should be noted that while it is preferred to needle the two batt components together in series into a single composite felt, other techniques may be used. These include flame, binder powder, binder fabric, hot melt, spray, and saturating lamination, and loose combination of the components together by rewinding together into a single composite put-up are also considered to be appropriate to produce the present invention.

It should also be noted that while two individual batts of fiber are preferred to produce the single composite felt of this invention, more than two batts of fiber will also produce the present invention, and embodiments including more than two batts of fiber are also included within the scope of the present invention. When more than two batts of fiber are used to form the single composite felt material, the gradient density concept must be maintained. In other words, in progressing from the upstream portion of the composite felt, a gradient density is maintained such that the finer particles are filtered out first, with the coarser particles being removed by the downstream portion of the composite felt material.

The resin used to stiffen the fibers is preferably phenolic, but may also include polyester, melamine, polyurethane, polyacrylic, and blends thereof that are suitable for use in a transmission filter hot oil environment. Typical phenolic resin inputs range from about 8–14% by weight add on for transmission filter felts. While the preferred resin application technique is kiss and mull saturation, other processes including dip and squeeze saturation, spray, foam, and the like, are acceptable to produce products according to the present invention.

The fibers used in forming the composite filter felt are preferably polyester, but also may include nylon, acrylic, modacrylic, aromatic polyamide, and the like which are suitable for withstanding the high temperatures experienced in automatic transmissions.

Figure 2:
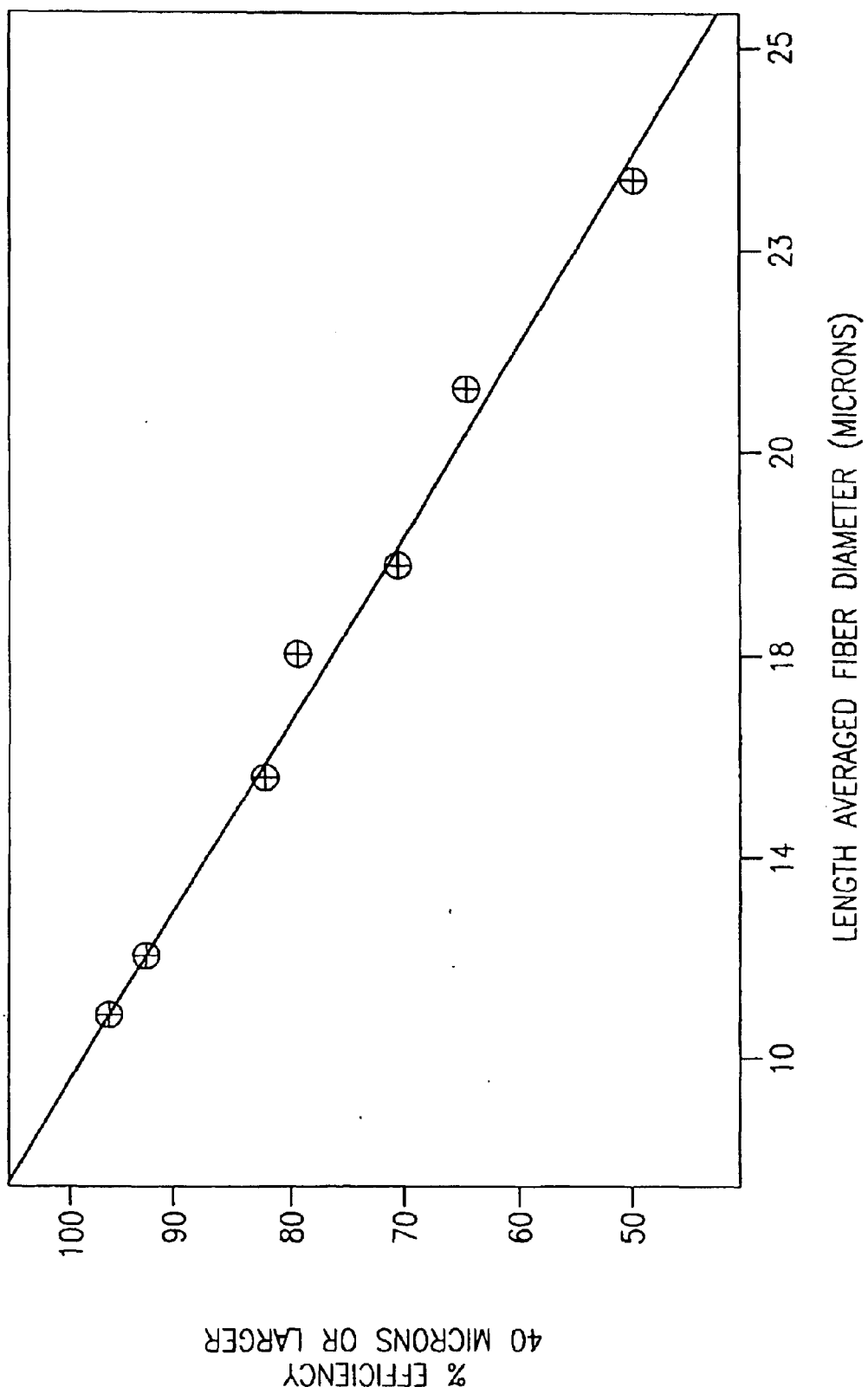
FIG. 2 is a diagrammatic representation of the relationship between the length averaged fiber diameter and the filter efficiency at a given particle diameter.

The length averaged fiber diameter of the composite felt has been found to have a direct relationship to filter material efficiency at 40 micron particle size or greater as seen in FIG. 2. The length averaged fiber diameter is the average fiber diameter based on the total length of each fiber diameter per unit mass in the felt composite. The length averaged fiber diameter that must be achieved to reach the level of at least about 80% efficiency for 40 micron particles or larger is about a maximum of 18 microns for the present invention. Above this length averaged fiber diameter, the filtration performance does not meet the levels desired in the application. Smaller length averaged fiber diameters than 18 microns increase the filter media efficiency performance and would be suitable for use in a transmission filter. Any blend of fibers that will achieve a maximum of about this length averaged fiber diameter is acceptable to meet the expected level of filtration efficiency. Length averaged fiber diameters below about 10 microns would increase the clean initial pressure drop in the filter to unacceptable levels in the transmission. Therefore, the acceptable operative range for use in this invention would be from about 10 to 18 microns length averaged fiber diameter.

PREFERRED EMBODIMENT OF THE INVENTION

TABLE 1 is a comparison of the physical properties, constructions, and flat sheet filtration test results of the saturated felt of the present invention to a standard single layered saturated felt, a tightened single layered saturated felt, and a single layered saturated felt laminated to a precision woven polyester scrim. The flat sheet test used was a modification of ISO 4572 Multipass Liquid Filter Test using MIL-Spec 5606 transmission oil for the test fluid. All tests were run at 3.6 fpm/face velocity using ISO Coarse dust. The material of the invention comprised a single composite felt having an upstream side of an open fiber portion containing fine fiber to remove the fine particles first and a coarser fiber downstream portion or side to mechanically entrap the coarser particles. The felts of the prior art comprised a blend of similar fibers that had a larger overall length averaged fiber diameter. The laminated woven scrim/felt product was constructed similar to the single layered felt. It is evident from the comparative data in the Table that the present invention had equivalent or lower clean pressure drop to the comparison products while exhibiting significantly higher dirt removal efficiency at 40 microns diameter or larger and almost double the dirt holding capacity of the comparison products. The product of the present invention exhibited by far the best balance of filtration properties and was suitable for use in an automatic transmission filter.

TABLE 1

|  | Preferred Embodiment | Standard Felt | Tightened Felt | Laminated Felt/ Woven Scrim |
| --- | --- | --- | --- | --- |
| Fiber Blend Upstream side (denier) | 75% 3.0 25% 1.5 | 50% 6.0 50% 1.5 | 50% 6.0 50% 1.5 | N/A |
| Downstream side (denier) | 100% 6.0 |  |  |  |
| Length Averaged | 18 | 24 | 24 | N/A |
| Fiber Diameter (Microns) |  |  |  |  |
| Fiber Type | polyester | polyester | polyester | polyester |
| Basis Weight (oz/yd²) |  |  |  |  |
| Upper portion (½ to ⅔ of thickness) | 5.0 |  |  |  |
| Lower portion (⅓ to ½ of thickness) | 2.5 |  |  |  |
| Total (saturated) | 8.4 | 8.2 | 8.6 | N/A |
| Permeability (cfm @ 0.5" water column | 194 | 162 | 177 | N/A |
| 1st Bubble (AC394) ("water column) | 3.3 | 3.1 | 3.7 | N/A |
| Thickness (mils) | 68 | 64 | 58 | N/A |
| Multipass Results ISO 4572 flat sheet Clean Press. Drop (psig) | 42.6 | 42.5 | 43.2 | 42.8 |
| Solidity | 8.2% | 9.1% | 10.1% |  |
| Dust Holding Capacity (g/ft²) | 24.8 | 14.9 | 11.7 | 15.1 |
| Efficiency @ Particle Size (% Micron) |  |  |  |  |
| 20 | 69.2 | 45.7 | 58.7 | 51.8 |
| 30 | 80.2 | 56.8 | 73.0 | 62.2 |
| 40 | 84.3 | 69.4 | 79.6 | 65.8 |
| 50 | 97.1 | 83.4 | 86.7 | 75.4 |
| 60 | 99.0 | 91.7 | 99.1 | 99.0 |
| 70 | 99.0 | 99.0 | 99.1 | 99.0 |

In the present invention, about ½ to ⅔ of the thickness of the upper portion of the composite felt contains about ⅔ of the total weight of the fibers in the composite. Conversely, ⅓ to ½ of the thickness of the bottom (lower) portion of the composite felt contains about ⅓ of the total weight of the fibers in the composite.

TABLE 2 illustrates the effect of the gradient density structure and its importance in filter media performance. The embodiment of the invention described above was tested from both sides of the composite felt for multipass performance in an effort to define the effect on filtration performance of having the coarser side upstream. The results indicated that when the fine fiber containing side was tested on the upstream side of the composite felt, the filter material had about three times the dirt holding capacity as when tested in the opposite flow configuration, graphically demonstrating the effect of the fine fiber removing first the fine plugging particles in the test dust and extending the useful life of the filter material. This construction allowed the downstream portion of the composite felt to be designed to remove by sieving substantially all the coarse particles, creating a much more porous filer cake built without a loss of particle removal efficiency.

TABLE 2

|  | Preferred Embodiment | |
| --- | --- | --- |
|  | Fine Fiber-Upstream | Fine Fiber-Downstream |
| Multipass Results Iso 4572 Flat sheet Clean Pressure Drop (psig) | 42.6 | 42.3 |

TABLE 2-continued

| | Preferred Embodiment | |
|---|---|---|
| | Fine Fiber-Upstream | Fine Fiber-Downstream |
| Dust Holding Capacity (g/ft$^2$) | 24.8 | 8.2 |
| Efficiency @ Particle Size (% Micron) | | |
| 20 | 69.2 | 72.4 |
| 30 | 80.2 | 82.6 |
| 40 | 84.3 | 86.9 |
| 50 | 97.1 | 94.4 |
| 60 | 99.0 | 99.1 |
| 70 | 99.0 | 99.1 |

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A transmission fluid filter material for the collection of solid particles of different sizes, comprising a gradient density composite felt having an upstream upper portion including a top surface and a downstream lower portion including a bottom surface, wherein said top and bottom surfaces define a predetermined thickness, said composite felt containing fibers of a desired length averaged fiber diameter and where between about ½ and about ⅔ of said thickness in the upper portion of said composite felt contains about ⅔ of the total weight of the fibers in said composite felt with said upper portion of said composite felt containing finer fibers than the lower portion of said composite felt, with said composite felt having a particle removal efficiency for 40 micron diameter particles or larger of at least about 80%, and a particle removal efficiency for 60 micron diameter particles or larger of at least about 99%, said composite felt having a length averaged fiber diameter range from about 10 microns to about 18 microns and a void volume from about 88% to about 94%.

2. The filter material of claim 1 in which the dirt holding capacity of said composite felt is at least about 20 grams/ft$_2$.

3. The filter material of claim 1, wherein said upper and lower portions are composed of respective batt layers combined together by methods including at least one selected from a group consisting of flame, binder powder, binder fabric, hot melt, spray, saturation lamination, and loose combination of said batt layers through rewinding together into a multiple layer put-up.

4. The filter material of claim 1 in which the upper and lower composite felt portions are combined by needlepunching.

5. The filter material of claim 1 in which the fiber types are selected from a group consisting of nylon, acrylic, modacrylic, and aromatic polyamide.

6. The filter material of claim 1 in which the fiber type is polyester.

7. A transmission fluid filter material for the collection of solid particles of different sizes, comprising a gradient density composite felt having an upstream upper portion including a top surface and a downstream lower portion including a bottom surface, wherein said top and bottom surfaces define a predetermined thickness, said composite felt containing fibers of a desired length averaged fiber diameter and where between about ½ and about ⅔ of said thickness in the upper portion of said composite felt contains about ⅔ of the total weight of the fibers in said composite felt with said upper portion of said composite felt containing finer fibers than the lower portion of said composite felt, said fine fibers increasing the particle removal efficiency of said composite felt, said composite felt having a low fiber solidity, low density, open pore structure and high, void volume for holding large amounts of particles with said upper portion of said composite felt being of a more open pore structure to allow for particles of about 60 microns and larger to pass through said upper portion to said lower portion of said composite while effectively removing particles of about 40 to about 60 microns in diameter, with said composite felt being singed on said top surface and said bottom surface, said composite felt being saturated with a resin suitable for use in a transmission filter, with said composite felt having a particle removal efficiency for 40 micron diameter particles or larger of at least about 80%, and a particle removal efficiency for 60 micron diameter particles or larger of at least about 99%, said saturated composite felt having a length averaged fiber diameter range from about 10 microns to about 18 microns and a void volume from about 88% to about 94%.

8. The filter material of claim 7 in which the dirt holding capacity of said composite felt is at least about 20 grams/ft$^2$.

9. The filter material of claim 7, wherein said upper and lower portions are composed of respective batt layers combined together by methods including at least one selected from a group consisting of flame, binder powder, binder fabric, hot melt, spray, saturation lamination, and loose combination of said batt layers through rewinding together into a multiple layer put-up.

10. The filter material of claim 7 in which the upper and lower composite felt portions are combined by needlepunching.

11. The filter material of claim 7 in which the resin is at least one selected from the group consisting of polyester, melamines, polyurethanes, polyacrylics, and blends thereof.

12. The filter material of claim 7 in which the resin is a phenolic resin.

13. The filter material of claim 7 in which the resin input is between about 8 to about 14 percent by weight of the felt.

14. The filter material of claim 7 in which the resin is applied using a method including at least one of a group consisting of dip and squeeze saturation, spray, and foam.

15. The filter material of claim 7 in which the resin is applied using a method of kiss and mull saturation.

16. The filter material of claim 7 in which the fiber types are selected from a group consisting of nylon, acrylic, modacrylic, and aromatic polyamide.

17. The filter material of claim 7 in which the fiber type is polyester.

* * * * *